J. A. McCULLOCH.
PIPE JOINT.
APPLICATION FILED NOV. 19, 1917.

1,314,410.

Patented Aug. 26, 1919.

WITNESSES

INVENTOR
J. A. McCulloch

UNITED STATES PATENT OFFICE.

JOHN A. McCULLOCH, OF NEAR McKEESPORT, PENNSYLVANIA, ASSIGNOR TO NATIONAL TUBE COMPANY, OF PITTSBURGH, PENNSYLVANIA, A CORPORATION OF NEW JERSEY.

PIPE-JOINT.

1,314,410.     Specification of Letters Patent.     Patented Aug. 26, 1919.

Original application filed February 26, 1913, Serial No. 750,856. Divided and this application filed November 19, 1917. Serial No. 202,749.

*To all whom it may concern:*

Be it known that I, JOHN A. McCULLOCH, a citizen of the United States, residing near McKeesport, in the county of Allegheny and State of Pennsylvania, have invented certain new and useful Improvements in Pipe-Joints, of which the following is a specification.

My invention relates to the construction of pipe joints by which the ends of metal pipes are connected, and more particularly relates to bell and spigot joints adapted for use in connecting the ends of wrought metal pipes or tubes to form fluid tight joints therebetween in constructing pipe lines.

One object of this invention is to provide a pipe joint of cheap and simple construction having novel means whereby the telescoping ends of the connected pipes are securely fastened together, whereby tight joints are obtained between the pipe ends, and whereby the gaskets are compressed tightly in place in forming tight joints and avoiding leakage.

A further object of this invention is to provide a bell and spigot joint having novel means whereby limited angular and endwise movements of adjacent joined pipes are made possible without impairing the tightness of the joint.

A still further object of the invention is the provision of a bell and spigot pipe joint having the novel constructions, combinations and arrangement of parts illustrated and described and particularly pointed out in the appended claims.

Referring now to the drawings forming part of this specification, Figure 1 is a sectional plan showing my invention as applied to a pipe joint of the bell and spigot type.

Figure 1:
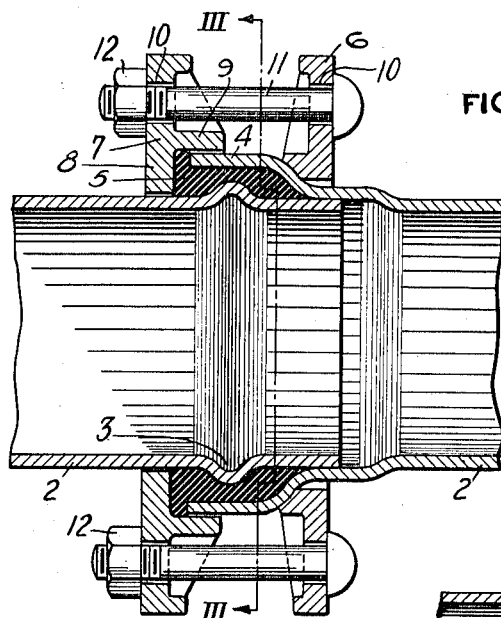

In the accompanying drawings the numerals 2 designate pipes or tubes having the ends thereof connected together and forming bell and spigot joints in accordance with my invention.

An annular bead 3 is formed on each pipe 2 closely adjacent to one end thereof and the other end of the pipe is expanded or enlarged to form a bell or hub 4 thereon, which telescopes over the beaded end of an adjoining pipe, the bell 4 being made of sufficient size to co-act with the telescoped beaded end 3 of another pipe to form an annular recess for the gasket 5, which is formed of rubber or other compressible material and which is located in the recess in the completed pipe joints.

Figure 3:
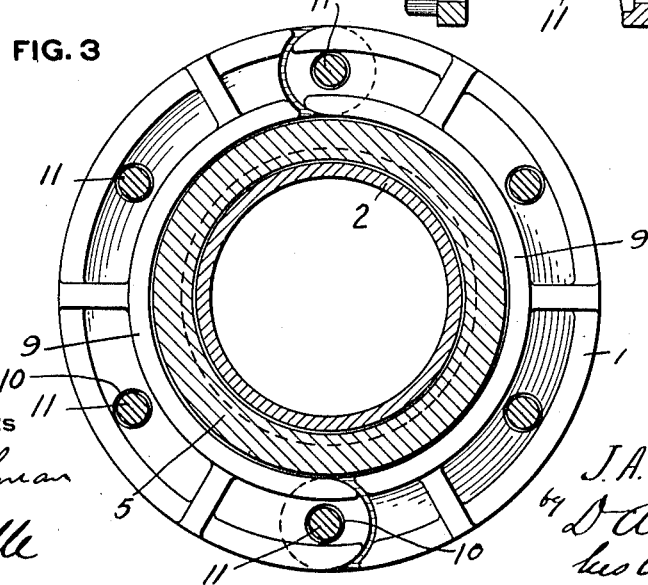
Fig. 3 is a transverse section of the construction shown in Fig. 1, the section being taken on the line III—III of Fig. 1.

A flange 6 is provided on the bell end 4 and a flange 7 on the beaded end 3 of each pipe 2, the flange 6 of Fig. 1 having an inwardly extending portion 8 arranged to engage with the material forming the packing 5 and being provided with an annular rib portion 9, adapted to telescope over the end of the bell 4 in forming an inclosing recess for the packing 5. The flanges 6 and 7 preferably will be made in sections as shown in Fig. 3 and hereinafter described, but may be formed integrally and positioned on the pipes prior to expanding the walls of the pipes in forming the beads 3 and bells 4 on the ends thereof, as will be readily understood. Registering openings or holes 10 are provided in the flanges 6 and 7 for the bolts 11 by which the flanges are secured together and held in position.

In forming a joint as shown in Fig. 1, the beaded end 3 of one pipe 2 is inserted within the bell end 4 of an adjoining pipe. The material forming the gasket or packing 5 is then placed within the recess formed between the walls of the telescoped pipe ends, and the bolts 11 are placed in position to connect the flanges 6 and 7.

As the nuts 12 on the bolts 11 are adjusted the inwardly extending portion 8 of the flange 7 engages with and compresses the packing 5 within the recess therefor, so as to form a tight joint between the telescoping pipe ends.

As the gaskets are arranged to surround the outer surface and extend on opposite sides of the annular beads 3 on the pipes 2 the gaskets are forced into close contact with the inner surfaces of the bell 4 on the pipe, the portion 8 of the flange 7 and the outer surface of the beaded end of the other pipe 2, as is clearly shown in Fig. 1.

Figure 2:
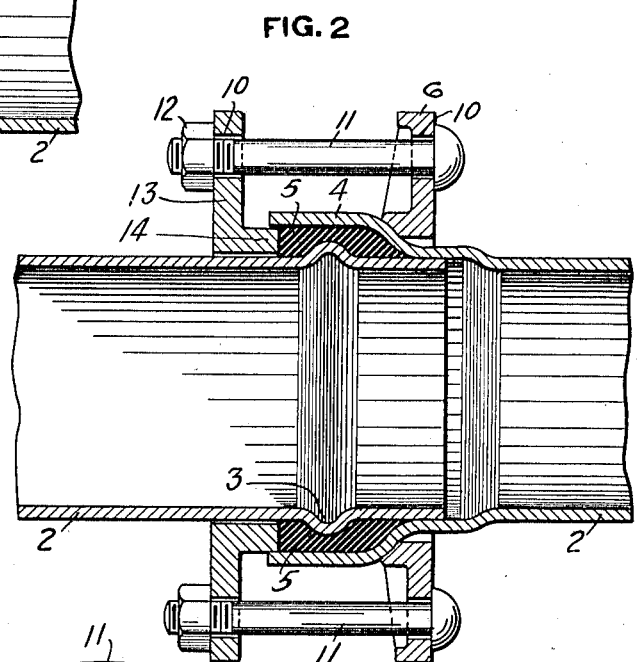
Fig. 2 is a sectional plan similar to that of Fig. 1, showing a modified form of joint of the bell and spigot type made in accordance with my invention.

In the construction shown in Fig. 2, one end of each pipe 2 is provided with a bead 3, and the opposite end with a bell 4, which are formed in the manner described in connection with Fig. 1. The bell end of the pipe 2 has a flange 6 similar to that shown in Fig. 1, and the flange 13 used on the beaded end of the pipe in the construction of Fig. 2 has an annular rib portion 14 which is adapted to enter the recess formed between the walls of the telescoped pipe ends. Openings or holes 10 are provided on the flanges 6 and 13, for the bolts 11, in the same manner as has been described in connection with Fig. 1.

In constructing joints like that shown in Fig. 2, the parts are assembled and secured together in a similar manner to that described in connection with Fig. 1, the annular rib portion 14 of the flange 13 forming a gland which enters the packing recess and compresses the packing 5 when the nuts 12 are turned on the bolts 11 in forming the pipe joint.

In this construction also the packing 5 extends into engagement with the pipes on both sides of the beads 3, so as to permit of a limited endwise or sidewise movement of one pipe relative to the pipe to which it is connected. It should be noted that in the construction of both Fig. 1 and Fig. 2 movement of one pipe toward or away from the other will not loosen the packing but will increase the amount of compression on the packing on one side of the rib or the other depending upon the direction of movement of the pipe or pipes.

The advantages of my invention result from provision of the integral beads on the metal pipes and the arrangement and location of the packing material or gasket with respect to the annular beads. The bead 3 and bell 4 on adjacent pipes and the flanges provide a positive connection between the ends of the pipes and prevent separation of the pipes at the joints. The flanges co-act with the walls of the telescoped ends of the pipes to form an inclosing recess in which the gasket is held so as to permit of a limited angular and slight endwise movement of one pipe relative to that to which it is connected without impairing the tightness of the joint.

Variations may be made in the form and arrangement of the bell, the beads, and flanges forming part of my improved pipe joint, within the scope of the appended claims.

I claim:—

1. A pipe joint comprising in combination adjoining pipes having telescoped bell and spigot ends arranged to form an annular packing recess therebetween, said spigot end having an integral bead thereon, a compressible packing within said recess arranged to cover said annular bead, and means whereby the connected pipe ends are fastened together, said means being adapted to compress the packing within said recess and around the annular bead to thereby form a yielding, fluid tight joint.

2. In a pipe joint, the combination of a pipe having a bell end, a second pipe having a spigot end, said spigot end being telescoped within said bell and said telescoped pipe ends co-acting to form an annular packing recess, a compressible packing within the recess, said spigot end having an annular bead thereon located between the ends of said recess in position to be covered by said packing, flanges on said pipe for securing the pipe ends in telescoped position, and fastening bolts for connecting said flanges, said bolts being arranged to cause a relative approach of the flanges, and the relative approach of said flanges being adapted to compress the packing material within said recess and around said annular bead, and thereby form a yielding, fluid tight joint between the telescoped pipe ends.

3. In a pipe joint, the combination of a pipe having a bell end, a second pipe having a spigot end, said spigot end being telescoped within said bell and said telescoped pipe ends co-acting to form an annular packing recess, a compressible packing within the recess, said spigot end having an annular bead thereon located between the ends of said recess in position to be covered by said packing, flanges on said pipe for securing the pipe ends in telescoped position, one flange having an annular projection adapted to enter said packing recess, and fastening bolts for connecting said flanges, said bolts being arranged to cause a relative approach of the flanges, and the relative approach of said flanges being adapted to compress the packing material within said recess and around said annular bead and thereby form a yielding, fluid tight joint between the telescoped pipe ends.

4. In a pipe joint, the combination of a pipe having a bell end, a second pipe having a spigot end, said spigot end being telescoped within said bell and said telescoped pipe ends co-acting to form an annular packing recess, a compressible packing within the recess, said spigot end having an annular bead thereon located between the ends of said recess in position to be covered by said packing, transversely divided, sectional flanges on said pipe for securing the pipe ends in telescoped position, and fastening bolts for connecting said flanges, said bolts being arranged to cause a relative approach of the flanges, and the relative approach of said flanges being adapted to compress the packing material within said recess and around said annular bead, and thereby form a yielding, fluid tight joint between the telescoped pipe ends.

5. The combination of telescoped bell and spigot pipes having an annular space between the lapped portions thereof, one end of said space being open and the other end being closed, one of the pipe ends having an annular bead within said space, elastically yieldable packing in said annular space and extending across the bead and against the closed end of said annular space, and means engaging the packing at the open end of said annular space and adjustable along the pipe to compress the packing within the annular space.

6. The combination of telescoped bell and spigot pipes having an annular space between the lapped portions thereof, one end of said space being open and the other end being closed, one of the pipe ends having an annular bead within said space, elastically yieldable packing in said annular space and extending across the bead and against the closed end of said annular space, and means for connecting and drawing together the pipes and including means engaging the packing at the open end of said annular space to compress the packing within said space.

7. The combination of telescoped bell and spigot pipes having an annular space between the lapped portions thereof, one end of said space being open and the other end being closed, one of the pipe ends having an annular bead within said space, elastically yieldable packing in said annular space and extending across the bead and against the closed end of said annular space, a loose annular flange embracing the pipe having the bell end, said bell end constituting an abutment for engagement by said flange, another flange loosely embracing the other pipe and engaging the packing at the open end of the annular space between the pipes, and fastenings connecting the flanges.

8. The combination of telescoped pipe ends having an annular space between the lapped portions thereof, one end of said space being open and the other end being closed, one of the pipe ends having an annular bead within said space, elastically yieldable packing in said annular space and extending across the bead and against the closed end of said annular space, and means engaging the packing at the open end of said annular space and adjustable along the pipe to compress the packing within the annular space.

In testimony whereof I have hereunto set my hand.

JOHN A. McCULLOCH.